United States Patent [19]

Bradshaw

[11] 3,729,858

[45] May 1, 1973

[54] INSECT TRAP

[75] Inventor: Thomas I. Bradshaw, St. Paul, Minn.

[73] Assignee: Minnesota Mining and Manufacturing, St. Paul, Minn.

[22] Filed: June 15, 1971

[21] Appl. No.: 153,223

[52] U.S. Cl. .................................................43/114
[51] Int. Cl. ...........................................A01m 1/14
[58] Field of Search.....................43/114, 115, 131, 43/107, 132

[56] References Cited

UNITED STATES PATENTS

| | | | |
|---|---|---|---|
| 1,087,921 | 2/1914 | Caldwell | 43/115 |
| 992,108 | 5/1911 | Bushbaum | 43/131 |
| 2,258,683 | 10/1941 | Ketterer | 43/114 |
| 1,645,715 | 10/1927 | Northrup | 43/115 |

FOREIGN PATENTS OR APPLICATIONS

| | | | |
|---|---|---|---|
| 5,175 | 5/1901 | Austria | 43/114 |
| 725,869 | 2/1932 | France | 43/114 |

*Primary Examiner*—Warner H. Camp
*Attorney*—Kinney, Alexander, Sell, Steldt & Delahunt

[57] ABSTRACT

A disposable, collapsible, water-resistant insect trap having a high degree of structural stability comprising a suitable flexible material folded into a structure having at least three projecting surfaces radially extending from a central axis and connected at one end by inwardly canted connecting members defining a containing area between said members and said surfaces, thereby exposing a relatively large exposed contact surface area which optionally has thereon an insect attractant and a tacky material to hold insects on said trap after they are attracted thereto.

4 Claims, 4 Drawing Figures

Patented May 1, 1973 3,729,858
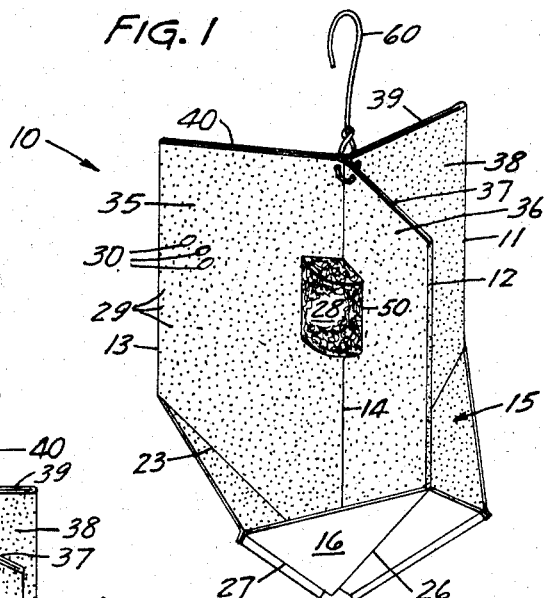
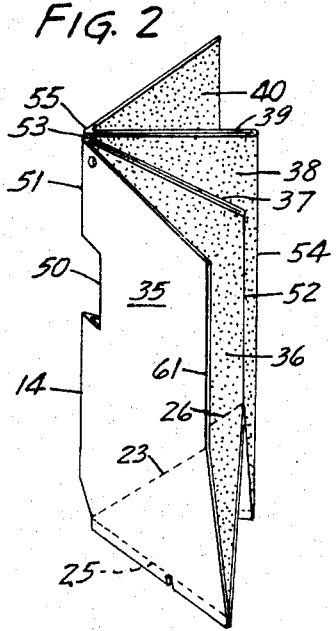
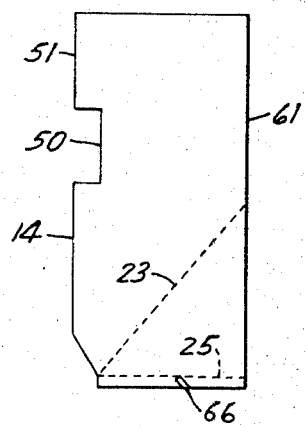
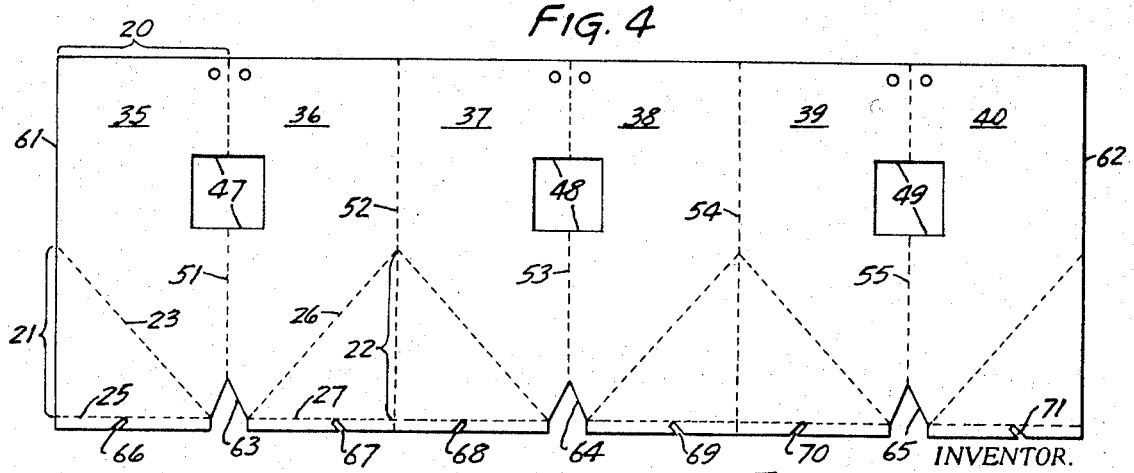
INVENTOR.
THOMAS I. BRADSHAW
BY Kinney, Alexander
Sell, Steldt & De La Hunt
ATTORNEYS

INSECT TRAP

BACKGROUND OF THE INVENTION

The present invention relates to a disposable, collapsible device for trapping insects. More particularly, the invention relates to an insect trap which traps insects, optionally through the use of an insect attractant and/or a tacky substance to hold the insects to the trap when attracted thereto. The substances used to attract and hold the insects to the trap are not hazardous to animals and the trapping device itself is economical, easy to use, and may be easily disposed of after use.

Insects, even through there have been many technical advances in entomology, still present a serious problem both hygenically and economically. Insects attack food-producing plants and their produce, transport disease-producing organisms, cause pain and discomfort by bites and stings, and are nuisances in many other ways. Various methods have been devised in an attempt to control various insect pests but have not always been found to be satisfactory for many applications. Most chemical insecticides are toxic and hazardous to birds, fish, animals, and even humans in relatively small amounts. Even extremely minute amounts are hazardous to some species. The damage caused to the environment by chemical insecticides is sometimes greater than the total benefit obtained through their use. Thus, the search has continued for economical, effective, specific, convenient and non-hazardous methods to control insects.

There are, at present, insect trapping devices which employ chemical insecticides therein. An example of such a device is described in U.S. Pat. No. 3,173,223. Such devices, however, are not practical for large scale trapping and killing of insects as they are generally bulky and inconvenient to transport and store and many are also complex and expensive to use. Further, the devices used at present are not effective for a wide variety of applications. A collapsible open-ended fly trap is disclosed in U.S. Pat. No. 1,112,064. The trap is of a triangular cross-section and lacks sufficient structural stability to withstand various outdoor environmental conditions. Further, the prior art trap does not expose a desirable amount of trapping surface area as disclosed hereinafter.

SUMMARY OF THE INVENTION

According to the present invention, a convenient, disposable, water-resistant, structurally stable insect trapping device is provided which is inexpensive and ideally suited for large scale trapping of insect pests. The device contemplates the use of a collapsible device, optionally having on at least one surface thereof, or centrally located in the trap, an insect attractant in combination with an insect entangling material to hold the insect to the trap after it has been lured by the attractant.

The insect trapping device of the present invention comprises, generally, a collapsible structure having at least three projecting surfaces radially extending from a common axis wherein said projecting surfaces are detachably connected at one end by inwardly canted connecting members, defining a containing area between said members and said projecting surfaces, said connecting members serving to also increase the exposed surface area for deposit of insect entangling material and increased entrapment.

An insect entangling material is not required for purposes of the present invention, although such material is preferred. When such a material is not used, apertures at the bottom of the containing area (preferably a funnel-shaped containing area) are large enough to allow insects to fall through the bottom of the trap into an attached container. The insects may be attracted by an insect attractant, by the color of the trap, or a combination thereof. The attached container may contain a tacky substance or an insecticide, or may be empty.

The trap preferably has a tacky insect entangling substance on at least a portion of the exposed projecting surfaces to hold insects to the trap upon contact with the tacky substance. This trap may also contain an attractant to draw insects thereto. Such traps require only some drainage means in the trap.

When constructed as described hereinafter, the trap of the present invention has excellent structural stability to wind, rain and dew, and general environmental conditions. Such stability is essential for use in trapping economically important insect pests in orchards, fields, forests and the like over periods of many days or weeks.

The invention will be better understood with reference to the drawings wherein:

FIG. 1 is a perspective view of one embodiment of the insect trapping device of the present invention, FIG. 2 is a view of the trap of FIG. 1 in a semi-collapsed or partially opened state, FIG. 3 is a view of the trap of FIG. 1 in a collapsed, packaged state, and FIG. 4 is a view of the device of FIG. 1 after cutting and creasing is completed but before assemblage of the trap.

Referring to the drawings, particularly FIG. 1, the insect trapping device 10 of the invention comprises essentially a structure having a series of radially extending projecting surfaces or vanes 11, 12, and 13 having a common axis 14, the vanes being linked or connected at one end by connecting members 15 and 16 and a member at the back (not shown) which are not horizontal to the vanes but slightly canted toward the axis 14. The connecting members serve to keep the vanes relatively equidistant and increase the structural stability of the trap. They also form a funnel-shaped ledge which catches insects which encounter the vertical surface of the trap but fall vertically rather than being entangled and held on the vertical surface. This particularly valuable feature of the trap provides increased efficiency, particularly for insect surveys by catching or guiding insects and presenting a larger surface area for a tacky insect entangling material if desired.

The connecting members serve to provide a rather funnel-shaped container which not only aids in catching and holding insects, but guides insects to the bottom of the trap. In this case it is sometimes desirable to have apertures on the bottom (not shown) to allow insects to pass into a container attached to the bottom of the trap (also not shown).

The trap also further may have a hanging device 60, a container 28 for an insect attractant located centrally in an aperture 50 in the device, and a tacky insect entangling substance 29 on the surfaces of the device. The attractant may also be present in the form of small droplets 30 or globules anywhere on the exposed surfaces, thus eliminating the need for a container and an aperture in the trap.

The insect trap of the present invention may be conveniently collapsed for storage and shipping into a small, compact unit as illustrated in FIGS. 2 and 3, and reopened into a usable structurally stable trap whenever the user wishes merely by opening the trap and fastening the connecting members into generally funnel-shaped connecting members as illustrated in FIG. 1. Preferably, the connecting members are preformed and remain so in the packaged state so that only the vanes have to be attached.

There may be at least three vanes or projecting surfaces in order to obtain stability of the trap, and may be increased to four, five, six or more. As the number of vanes increases from three, the overall size of the trap becomes important. The limiting factor is that the space between the exterior edges of the vanes must be sufficiently wide to enable the insect species to enter and contact the tacky substance or to fall to the containing area or an additional container attached to the trap if no tacky substance is used. A further consideration is the increasing complexity of making the trap as the number of vanes and connecting members is increased. Also, the insect entrapping surface area may be increased substantially by the addition of more projecting surfaces. Thus, depending on the species of insect to be trapped, the above-mentioned factors should be considered in selecting the most efficient number of vanes.

The assemblage of the trap of the present invention is simple and convenient and is best illustrated with reference to FIG. 4. As a preferred initial step, the insect entangling material is deposited on the trap surfaces before assemblage but may also be deposited thereafter if desired. A flat elongated sheet of a flexible, semi-rigid material is cut as shown in FIG. 4 and fold lines are placed at 51, 52, 53, 54, 55, 23, 25, 26, etc. Three generally square apertures, 47, 48, and 49 are cut in a generally central location in each major section as illustrated. The trap then has six exposed surfaces in its assembled position, in addition to the connecting members 15 and 16 which surfaces are numbered 35, 36, 37, 38, 29, and 40. When the trap is to be assembled, folds, 51, 53 and 55 are bent in a downward position in relationship to the horizontal plane of the two dimensional drawing, while folds 52 and 54 are bent in an upward position. Ends 61 and 62 are then brought around until they are flush with each other and fastened so that sides 35 and 40 are directly opposed. At this point, fold lines 51, 53, and 55 are in contact centrally in the device and form a common axis 14. Also apertures 47, 48, and 49 meet at the central axis to form a three-dimensional aperture 50 which may be used to hold an insect attractant receptacle 28. At this point, vanes 11, 12, and 13 are also formed.

The connecting members are then formed by folding fold line 23 and 26 upward and lines 25 and 27 downward, bringing lines 25 and 27 together and fastening them, for example, by tape, glue, or heat sealing, and form the completed connecting member 16 as illustrated in FIG. 1. A hanging device, such as a wire hook 60 is then attached to the top of the device serving to hang the device in its desired location.

A series of notches such as those shown in FIG. 4 as 66 to 71 may be used in conjunction with each other to tightly join the portions of the connecting members and form a receiving notch or groove (not shown) generally located at the bottom of the trap for holding a container such as a jar. Additional fastening means for holding a container may be used.

The apertures 63, 64, and 65 illustrated in FIG. 4 can be varied in size to allow insects to encounter the trap and fall down through the apertures where an insect entangling substance is not employed. In such cases a container is fitted and attached to the bottom of the trap. The insects which fall through the hole are collected in the attached container. The use of a collecting container allows easier sorting and identification of insects for survey purposes. If desired, an insecticide may be included within the container to kill the trapped insects, although most insects do not readily find the entrance (or exit) and stay trapped within the container. The container may also have an insect entangling substance therein on one or more surfaces, or such substance at the edges of the entrance aperture may be used to discourage egress from the container.

The connecting members 15 and 16 are formed to allow their juncture and funnel-shaped ledge configuration by adjusting the distances 21 and 22 to a distance illustrated by the formula: $d = b \cos[(180-360/n)/2]$ wherein $n$ is the number of vanes and $b$ is the distance 20. This is a general formula. Note that $n$ must be 3 or more.

The insect trapping device of the present invention, when in its disassembled state, comprises generally then a flat, elongated sheet of a flexible, semi-rigid material having fold lines located at intervals corresponding to equal fractions of the length, for example, to about one-sixth the length of the sheet, the ends of the sheet being attached to form a collapsed structure having at least three projecting surfaces extending from a common axis, the surfaces being in close proximity when the device is in a flat, collapsed position; optionally a tacky, insect-entangling material disposed on the surfaces forming a continuous or partial layer between the surfaces; and means attached to the device for the hanging thereof in a desired location; whereby, the structure may be manipulated to form a trap having at least three projecting surfaces radially extending from a common central axis, the surfaces being detachably connected at one end by inwardly canted connecting members; the surfaces having the tacky material disposed thereon for catching and holding insects.

Although non-horizontal, canted connecting members are required at the base of the device, perpendicular members could also be used at the top of the device in combination with those members at the bottom. The use of perpendicular members at the top of the trap is clearly an optional variation of the basic design, and may be varied depending upon the insect to be trapped, the environment and the weather in which the trap is to be used. For example, upper perpendicular members could serve as an additional trapping surface if desired. Falling leaves or other debris, and/or excess precipitation may suggest or require the use of perpendicular protective members at the top of the trapping device.

The insect trap may be mounted in numerous ways, preferably by employing a hanging device 60 which is pivotally attached to the trap at or near the top. Such a hanging device may be inserted in the device during manufacture or may be thereafter clamped, glued, stapled, or otherwise fastened to the device. The hanging devices are then merely placed over some object in the area in which insect control is sought, e.g., the branch of a tree. The trap could, however, also be set in any appropriate holder and fastened thereto to obtain a stable configuration without support. The trap may also be fastened to any available material, such as a fence, in the area in which insect control is sought.

The collapsibility of the trap is a distinct advantage as large numbers of such traps may be taken into the field at one time due to the small bulk of the trap in the collapsed state whereas large bulky traps use up quite a large amount of space both during shipment and when taking them into the field to be used. There may also be one or more additional tabs attached to the edges 61 and 62 to facilitate this procedure. It is further preferred that the hanging device, or part of the hanging device be sufficiently flexible to allow it to be bent and closed tightly over a projection when it is suspended therefrom such as the tree limb, nail, wood rod, or the like. Although a metal hanging device is preferred and is readily available for most applications, any suitable material may be used.

Materials from which a collapsible trap 10 may be constructed include sheets of semi-rigid plastic; for example polyethylene, polypropylene, and the like; metal foil, such as aluminum foil; or preferably paper, which may be treated to render such paper essentially grease and water proof. Paper is preferred because it is inexpensive, easy to work with, light and renders the trap more easily disposable. The paper should be of sufficient weight to maintain dimensional stability, for example, 0.009 inch tag stock which may be treated with wax, polyethylene, silicones, and the like to give a grease and rain resistant surface. The grease-resistant surface is desirable to resist migration of the tacky substance coated on the inner walls into the paper which would decrease its availability to insects flying into the trap. Water resistance is desirable as the trap will very often be exposed to rain, dew, or other moisture phenomena. Although the color of the paper is not known to be critical, it may be expected that either bright, dark or light colors may prove advantageous for certain insects.

The tacky substance 29 which catches and thus kills insects is placed on the projecting surfaces of the insects trapping device during manufacture and optionally on the connecting members such as at planes 35, 36 and 38. The material used must maintain its tackiness when exposed to environmental conditions, such as wind, rain, etc. Examples of such substances are solutions of gum, rubber, and mineral oil, polybutenes, and mixtures of wax and resins. The substance is coated on the surfaces of the device, generally before the connecting members 15 and 16, or shelves are formed. Preferably, the tacky material is coated on all of the outer vertical and on top of the horizontal surfaces as illustrated, or on any appropriate surface depending on the location of the vanes and connecting members.

The insect attractant which is used may be any suitable substance which attracts one or more species of insects. Said substances include sex (or mating) attractants, swarming attractants, feeding attractants, and the like. Known sex attractants include riblure, propylure, hexalure and grandlure. The attractants may be effective by themselves, may require a synergist or may be used in combinations. The type of attractant used will depend entirely upon type of insects desired to be trapped and would be obvious to those skilled in the art. Generally, such substances are naturally occurring and substantially nontoxic.

The attractant may be placed in the trap in a manner designed to permit its gradual, as well as immediate release. The attractant may also be mixed with melted paraffin wax and the mixture is applied to the outer surface of the trap as droplets 30 before or after the tacky substance 29 is applied allowing the mixture to solidify. The paraffin used may have a high or low melting point depending upon the conditions to which it will be exposed, since it is preferable that it remain solid. Another method of holding the attractant in the device is to place it in a plastic receptacle, seal the receptacle, and at the time the trap is set or assembled, place the receptacle in the tacky substance, which generally holds such receptacles securely. The material used for the receptacle must be such that the attractant will be allowed to diffuse therethrough. Other methods useful for permitting the gradual release of the attractant include encapsulation with plastic or glass bubbles, and incorporation within the receptacle material. If desired, a colorant or dye may be added to the attractant mixture in order to clearly indicate its presence to those using the trap.

A particularly useful method of baiting the trap is illustrated in FIG. 1. An attractant is placed in a cylindrical receptacle 28 and at the time the trap is assembled for use, the receptacle is inserted into the aperture 50. The trap is then assembled by joining surfaces 35 and 40 so that edges 61 and 62 are nearly flush with one another. One convenient method for joining the places is to apply one face of a double-backed pressure-sensitive adhesive tape to one of the surfaces 35 and 40. The other face of the tape is covered by a protective liner until the trap is to be used when the liner is removed and the surfaces are attached. Other methods such as clamping, stapling, gluing and the like could also be used.

When a cylindrical attractant receptacle is used, the receptacle may contain an attracting chemical substance or mixture of such substances or a live insect.

The invention will be further illustrated by reference to the following illustrative examples wherein all parts are by weight unless otherwise specified.

EXAMPLE 1

Insect traps according to the present invention were prepared as follows: a 8.5 inch by 21 inch piece of card designated 0.009 inch bleached tag stock available from H. P. Smith Paper Co., Chicago, Ill. was coated on both sides with polyethylene to make it water and grease proof. The card was cut and scored for folding as illustrated in FIG. 4 of the drawing. The paper was then coated with a tacky insect entangling substance, "Bird Tanglefoot," available from the Tanglefoot Co., Grand Rapids, Mich. The tacky substance consists of 97 percent polybutenes and 3 percent hydrogenated caster oil. Eighteen grams of the tacky substance were coated on the entire surface of one side of the card. Three apertures were cut in the card as illustrated in FIG. 4.

The card was then folded and hinged with self-adhesive or double-stick tape with the surfaces having the tacky material thereon facing each other. The other surfaces were thus free from the tacky material. The non-horizontal, canted connecting members at the bottom of the card, as shown by the fold lines, were heat-sealed independently so as to hold the ledge together. Thus, when the trap was unfolded through 360°, about the central axis, the connecting members opened, formed a canted connecting member in the space between the three vertical vanes or projecting surfaces forming a containing area between the vanes and the connecting member. The outer panels were bonded together with double-backed, self-adhesive tape to form the third vane.

A soft-wire hook was attached to the opened trap through a small hole near the top of the central axis.

About 15 grams of a mixture comprising a sex attractant of the female red banded leaf roller moth, 40 percent cis-11-tetradecenyl acetate ("Riblure"), and 60% dodecyl acetate, a synergist for Riblure was placed in a cylindrical receptacle which was 2 inches in diameter and 1.25 inches deep. The cylinder was placed in the centrally located cut out section of the trap prior to joining the outer vanes together. When these vanes were joined, the container was locked into place, i.e., it could not be removed without detaching the outer vanes and folding them back.

The traps were placed in the branches of apple trees where the red-banded leaf roller moth had been a serious problem in recent years. The traps were checked periodically and were found to provide an effective means for trapping this moth.

EXAMPLE 2

An insect trap according to the present invention was prepared as follows: a 8.5 inch by 21 inch piece of card designated 0.009 inch bleached tag stock available from H. P. Smith Paper Co., Chicago, Ill. was coated on both sides with polyethylene to make it water and grease proof. The card was cut and scored for folding as shown in FIG. 4. Three apertures were cut in the card as illustrated in FIG. 4.

The card was then folded and hinged with self-adhesive or double-stick tape with the surfaces having the tacky material thereon facing each other. The non-horizontal canted connecting members at the bottom of the card, as shown by the fold lines in FIG. 4, were heat-sealed independently so as to hold the ledge together. Thus, when the trap was unfolded through 360°, about the central axis, the connecting members opened, formed a canted connecting ledge in the space between the three vertical vanes or projecting surfaces and formed a containing area between the projecting surfaces and the connecting ledge. The outer panels were bonded together with double-backed, self-adhesive tape to form the third vane.

A soft-wire hook was attached to the open trap through a small hole near the top of the central axis.

A cylindrical receptacle 2 inches in diameter and 1.25 inches deep, and containing an insect attractant was placed in the cut out section of the trap prior to joining the outer vanes together. The insect attractant was cis-7-hexadecenyl acetate ("Hexalure"), the male pink boll worm attractant. When these vanes were joined, the receptacle is locked into place, i.e., it could not be removed without detaching the outer vanes and folding them back. Traps placed in suitable locations in a cotton field consistently trapped male pink boll worm moths.

What is claimed is:

1. A collapsible insect trap comprising: a single, elongated sheet of a flexible, semi-rigid material having at least five vertical fold lines across the width of said sheet at right angles to the long axis thereof, said lines being equispaced along the length of said sheet, and having a plurality of angular fold lines beginning at the lower end of alternate vertical fold lines and running across the lower portion of said sheet to the adjacent vertical fold line, adjacent angular fold lines being in opposite directions and meeting at each end at an angle to the long axis of said sheet so that one edge of the sheet and the equispaced vertical and angular fold lines define a series of triangles, said rectangular sheet being folded upon itself in successive alternate directions on the equispaced fold lines and adaptable to being attached to itself at the point where said folds meet to form a common axis, and adjoining triangles being attached at their bases defined by the edge of the sheet, thus forming a collapsible or expandable structure having at least three projecting vanes from said common axis and having inwardly canting means formed by said triangles connecting said vanes at their lower end defining a container area between said means and said vanes to maintain said vanes essentially equidistant from each other, increase the structural stability of the trap, provide surfaces for retaining insects and guide insects into said containing area.

2. The collapsible insect trap of claim 1 additionally having a tacky, insect-entangling substance on at least a portion of the projecting surfaces and the connecting member ledges to hold insects to the trap upon contact with said substance.

3. The trap of claim 1 additionally having a container for holding insects attached to the end of said trap having said connecting members and having at least one aperture proximate said container to allow insects to pass into said container after being guided into said containing area of said trap.

4. A collapsible insect trapping device comprising: a flat, single elongated sheet of a flexible, semi-rigid material having at least five fold lines across the width of said sheet at right angles to the long axis thereof, said folds being equispaced along the length of said sheet, and having a plurality of angular fold lines beginning at the lower end of alternate vertical fold lines and running across the lower portion of said sheet to the adjacent vertical fold line, adjacent angular fold lines being in opposite directions and meeting at each end at an angle to the long axis so that one edge of the sheet and the equispaced vertical and horizontal fold lines define a series of triangles, said rectangular sheet being folded upon itself in successive alternate directions on the equispaced fold lines and adaptable to being attached to itself at the point where said folds meet to form a common axis, and adjoining triangles being attached at their bases defined by the edge of the sheet, thus forming a collapsible or expandable structure having at least three projecting vanes from said common axis, and having inwardly canting means formed by said triangles connecting said vanes at their lower end to maintain said vanes essentially equidistant from each other and to increase the structural stability of the trap; a tacky insect-entangling material disposed on said surfaces forming a continuous layer between said surfaces; and means attached to said device for the hanging thereof in a desired location; whereby, said structure may be manipulated to form a trap having three projecting surfaces radially extending from a common central axis and inwardly canted connecting members defining a containing area between said members and said projecting surfaces, said surfaces and said connecting members having said tacky material disposed thereon for catching and holding insects.

* * * * *